United States Patent [19]

Jones

[11] 3,916,441

[45] Oct. 28, 1975

[54] TAPE TRANSPORT HAVING VARIABLE TORQUE CONSTANT REEL AND CAPSTAN DRIVE MOTOR

[75] Inventor: Hale M. Jones, Playa del Rey, Calif.

[73] Assignee: Ampex Corporation, Redwood City, Calif.

[22] Filed: July 1, 1974

[21] Appl. No.: 484,394

[52] U.S. Cl. .......................... 360/90; 318/6; 360/71

[51] Int. Cl.²................ G11B 15/46; G11B 15/58; G11B 15/44; H02P 7/74

[58] Field of Search........... 360/72, 71, 130, 90, 73, 360/74, 83; 242/182, 183, 186; 318/6, 7, 81, 84, 351, 340, 432, 441, 98–100

[56] References Cited

UNITED STATES PATENTS

| | | | |
|---|---|---|---|
| 3,191,180 | 6/1965 | DeGraef | 360/90 |
| 3,400,895 | 9/1968 | Cole et al. | 318/7 |
| 3,487,392 | 12/1969 | Lewis | 360/90 |
| 3,525,481 | 8/1970 | Longland | 242/183 |
| 3,612,965 | 10/1971 | Harwood | 318/7 |
| 3,673,473 | 6/1972 | Werner | 318/6 |
| 3,811,078 | 5/1974 | Greblunas | 318/99 |

*Primary Examiner*—Alfred H. Eddleman

[57] ABSTRACT

A magnetic tape transport includes reel and capstan drive motors having one torque constant for normal bidirectional programming operation which is readily modified for high speed rewind. The direct current motors are provided with both a permanent magnet field and a wound field, the energization of which is selectively modified by a field control current to achieve selected torque constants for optimum operating efficiency in a plurality of operating modes having widely varying speed and torque requirements. A small torque constant permits high speed, low torque rewind operation without need for excessively high drive voltages, while switching to a higher torque constant permits higher torque, lower speed normal programming operation without need for drive circuits having large numbers of power transistors handling large drive currents. The permanent magnet portion of the field further insures the presence of adquate field flux for effective dynamic braking when the armature terminals are shorted even if there is a power failure.

31 Claims, 12 Drawing Figures

TAPE TRANSPORT HAVING VARIABLE TORQUE CONSTANT REEL AND CAPSTAN DRIVE MOTOR

BACKGROUND OF THE INVENTION

1. Field of the Invention

The present invention relates to intermittently operated digital magnetic tape transports, and more particularly to tape transports having variable torque constant motors for advantageously driving the capstan and reels.

2. History of the Prior Art

Magnetic tape transports, particularly those of the type used in conjunction with data processing operations, have undergone substantial changes and improvements in an effort to meet the high requirements imposed on such systems. For example, it is commonplace to require a transport having a normal bidirectional or programming operation speed on the order of 200 inches per second and a rewind speed on the order of 640 inches per second or greater. In systems of this type the capstan or capstans used to drive the tape during normal operation are not disengaged from the tape during rewind. It is therefore common to require capstan and reel drive motors and associated circuitry associated circuitry which are capable of providing the necessary motor torque during normal operation and which are at the same time capable of providing high speed rewind under conditions in which the torque requirements may be considerably less.

A major problem in providing motor drive systems of the type described lies in the fact that a motor torque constant ideally suited for normal programming operation is typically unsuitable for high speed rewind. Motor torque constant, KT, is defined as the number of inch-ounces of torque at the motor shaft per ampere of input current (in.-ounces)/amp. Another motor constant, $K_B$, varies with the torque constant and is defined as the number of motor volts per thousand revolutions per minute (volts)/K rpm.

In designing a conventional reel motor a tradeoff compromise must be made between selecting a torque constant which is ideal of normal programming digital operation and selecting a torque constant which is ideal for high speed rewind. As the torque constant is increased the reel motor becomes more suitable for normal programming digital operation but the power supply voltage must be increased in order to attain adequate speed during rewind. This means that more expensive transistors having a greater collector-emitter breakdown voltage must be employed in the drive circuit. Alternatively, when the torque constant is decreased the power supply voltage can be decreased but increased armature current is required during normal programming digital operation necessitating the use of additional power transistors in the drive circuit in order to accommodate the additional current.

One possible arrangement would be to optimize the torque constant for normal programming digital operation and use a relay to selectively connect the normally grounded armature terminal to a supply voltage opposite in polarity to the rewind voltage at the normal drive terminal. This doubles the effective supply voltage during rewind without need for expensive transistors, but the relay introduces undesirable voltage and current spikes into the tape transport system. An alternative arrangement would be to use a bridge amplifier having what amounts to two drive circuits. This arrangement solves the problems of high voltage and high current without introducing undesirable spikes, but requires considerable additional circuitry.

The various problem solving approaches discussed above assume that the motor torque constant is to remain constant at all times. Such approaches accommodate a fixed torque constant motor which is ideally suited either for normal operation or high speed rewind but not both by providing the greater voltage or current then that normally required. A different approach to the problem of optimizing reel motor performance for both normal operation and high speed rewind is to provide reel drive motors with variable torque constants. This cannot be done in the case of a permanent magnet motor since the torque constant depends on the motor field strength which is fixed. However, in wound field motors it is possible to vary the torque constant as much as 2:1 or in some cases even 3:1 by making certain sacrifices which turn out to be significant. One problem stems from the fact that the high current required in the field winding of a wound field motor necessitates use of either a separate power circuit or a relay. Accordingly, the problem is just as serious as in the case of fixed torque constant motors where the addition of similar circuitry is required. A further problem arises in varying the magnetic field from the fact that most wound field motors of the variable torque constant type are relatively unstable at magnetic field strengths generating less than one third of the nominal torque constant $K_T$. Thus, while the torque constant of such motors is highly predictable within a limited high field voltage range, the torque constants can vary over a considerable range and produce unpredictable behavior if the field voltage becomes too low.

A further problem with wound field motors of any type is that of dynamic braking. There are certain situations such as in the case of a power failure where it is desirable to brake the tape reels to a stop in a controlled fashion to prevent tape breakage. In the case of a permanent magnet reel motor it is a simple matter to provide circuitry which will short circuit the motor armature terminals and decelerate the motor to rest in a controlled fashion in the event of a power failure. In the case of a wound field motor however the field disappears upon power failure so that there is no dynamic braking. To compensate for this, expensive and complex circuitry such as banks of capacitors must be added so as to maintain the field power supply for a selected period of time after power failure so that dynamic braking can be accomplished.

The performance of the capstan and reel drive motors greatly affects the overall performance of the tape transport system, and accordingly such motors have become an important and integral part of the overall transport system design. From a manufacturing standpoint the capstan and reel motor drive systems greatly affect the overall transport system in terms of cost, size, complexity and reliability. During actual operation and aside from the actual performance requirements of such motors the power dissipated by the servo circuits including the drive amplifiers as well as the motors themselves plays an important role in the cost and efficiency of operation. As noted above, prior art tape transports leave much to be desired because of complexity, high power consumption and overall expense of the capstan and reel drive systems. A further factor of at least equal importance is the rotational performanace of such systems which frequently leaves much to be desired. Thus, even though the torque constant of a capstan or reel motor may be variable, the range of variation is typically unduly limited so as to result in something less than excellent performance at both normal programming operating speeds and during high speed rewind.

BRIEF SUMMARY OF THE INVENTION

Magnetic tape transport systems in accordance with the invention utilize reel or capstan drive systems which have variable torque constant motors without the concomitant disadvantages of such motors. Capstan and reel drive motors according to the invention have a plurality of magnetic field generators which enable variation of the torque constant over a relatively wide range with ratios of 1:5 and 1:10 being easily attained. At the same time such motors have a relatively low power consumption which remains relatively constant for variations in the torque constant and which eliminates the need for expensive and undesirable relays or additional power supply circuitry and the added number of power transistors usually associated therewith. Dynamic braking is provided without the need for storage capacitors or other additional circuitry typically required in the transports of the prior art.

Reel and capstan drive motors used in accordance with the invention include at least two separate field generating means generating at least two independent magnetic field components, at least one of which is variable. When a field generating winding is energized with direct currents of different values, the effects thereof combine with the effects of the other field generating means to produce different levels of field strength at armature means comprising one or more armatures. By way of example the wound field generator may be energized by direct currents which are equal in value but opposite in polarity so as to provide a field which either adds to or subtracts from the field produced by the other field generating means. The two different values of field strength determine the two different values of torque constant at which the motor can operate. Accordingly, the motor can be designed to produce torque constants which optimize motor performance for both normal programming operation and rewind operation in a tape transport system. The motor can be designed so that the field generating means rotate and are suppplied through commutators while the armature means is stationary, or vice versa.

In one example on a tape transport in accordance with the invention the field generating means of the capstan and reel drive motors comprise a permanent magnet portion and a wound conductor portion. When the winding is energized with a direct current of one sense the resulting field adds to that produced by the permanent magnet to provide the motor with a relatively high torque constant of predetermined value. On the other hand when the winding is energized by a direct current of equal value but opposite sense the resulting field subtracts from that produced by the permanent magnet to provide the motor with a relatively low torque constant. Thus the motor has sufficient torque to meet the system requirements for normal programming operation when the fields from the permanent magnet and the winding add together to produce the higher of the two possible torque constants. When the fields subtract from one another to produce the lower torque constant, the motor is capable of operating at the high speeds necessary for rapid rewind without increase in voltage or overall power required thereby. Because of the optimization of motor drive requirements the motor drive circuitry may be relatively simple in design and requires only a very few power transistors. The absence of high current requirements during normal programming or high voltage requirements during rewind eliminates the need for separate power supply circuits, switching relays and the like. The presence of the permanent magnet permits effective dynamic braking during power failure without requirement for capacitors or other expensive circuit components to maintain a power supply for a wound field portion. The permanent magnet and wound field portions of the motor combine to produce a torque constant characteristic which is relatively stable for practically all values of current and voltage.

Advantage may be taken of this torque constant stability by preadjusting the torque constant of a motor at the time of installation in a system. By providing a potentiometer or other current adjustment device, the field current can be preadjusted to provide one or more predetermined torque constants with an accuracy of ± 1%. A typical alnico permanent magnet motor has a tolerance of ± 10% on the torque constant. The servo control circuits must normally allow for these tolerance variations. However, with a closer tolerance on torque constant, the gains of the servo control loops may be set to provide an improved, more predictable performance from the motor.

A wound field energization circuit in accordance with the invention provides a controlled transition from normal programming field energization to high speed rewind field energization. Such a circuit permits high torque, rapid tape acceleration to a normal programming speed in the reverse direction and then a smooth transition to the lower, high speed rewind torque constant as the tape accelerates beyond normal operating speeds. As specifically disclosed, a linear or ramp function variation in field energization provides an excellent relationship between torque constant and motor speed while avoiding sharp voltage spikes that might damage the motor drive cirucits.

BRIEF DESCRIPTION OF THE DRAWINGS

The foregoing and other objects, features and advantages of the invention will be apparent from the following more particular description of preferred embodiments of the invention, all illustrated in the accompanying drawings, in which.

DETAILED DESCRIPTION

Figure 1:
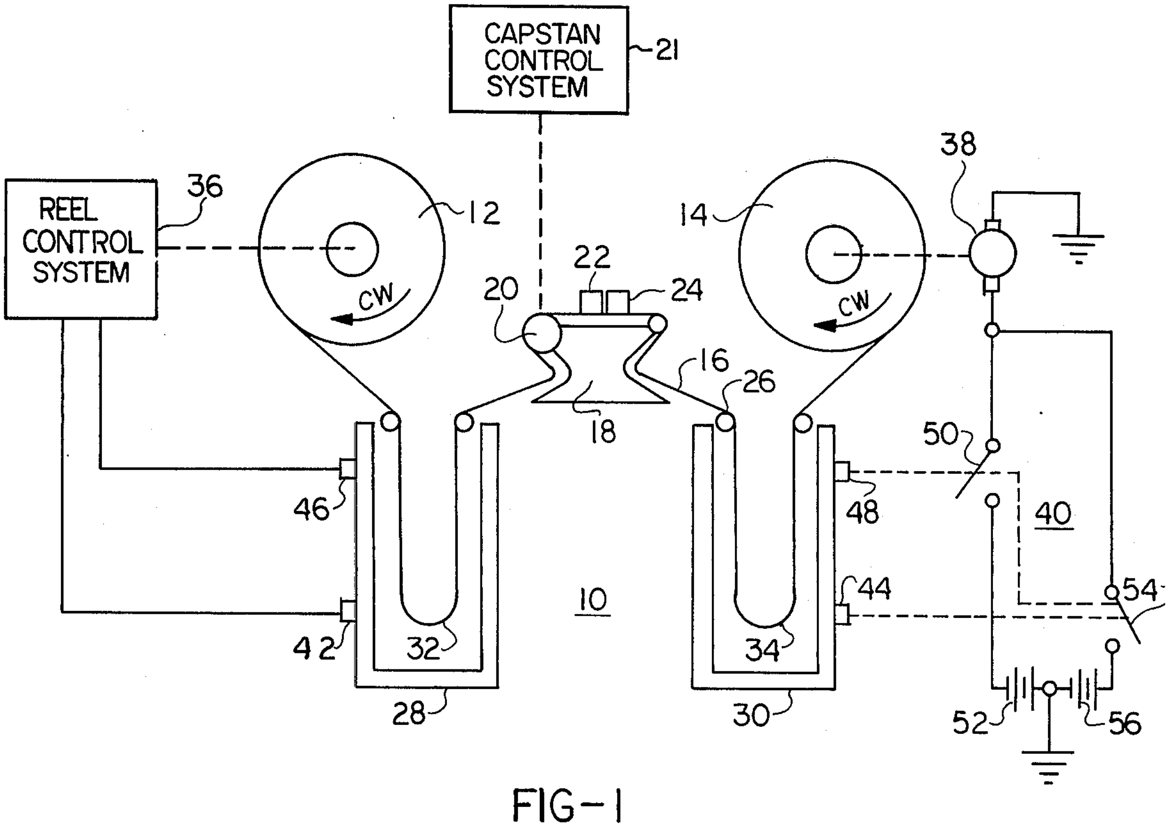
FIG. 1 is a partial plan view and partial schematic diagram of a magnetic tape transport system in accordance with the invention using a variable torque constant capstan and reel drive motor systems.

FIG. 1 illustrates a magnetic tape transport system 10 as including a pair of tape storage reels 12 and 14 having a length of magnetic tape 16 wound thereon. The tape 16 extends through a central driving and processing region 18 which includes means for driving the tape in the form of a single capstan 20 driven by a capstan control circuit 21 and means for processing the tape in the form of magnetic heads 22 and erasing means 24.

A plurality of idler wheels 26 are disposed between the reels 12 and 14 so as to define a tape path which includes a pair of vacuum chambers 28 and 30 respectively located between the central driving and processing region 18 and the reels 12 and 14. The chambers 28 and 30 operate in conventional fashion to form buffering loops 32 and 34 respectively in the magnetic tape 16. The take-up reel 12 is driven by a reel control system 36 which includes a reel drive motor, reel drive logic, a field energization circuit and an armature energization circuit. In like fashion the supply reel 14 is driven by a reel drive motor 38 included within a reel control system 40 which is identical to the circuit 36 but which has the armature energization circuit illustrated schematically.

The reel control systems 36 and 40 operate in well known fashion by responding to external commands and to signals indicating the positions of the tape loops 32 and 34 within the respective pair of vacuum chambers 28 and 30 to drive the reels 12 and 14 in appropriate fashion. In the tape transport system 10 of FIG. 1 the loop position sensing system is shown in simplified form as including long loop sensors 42 and 44 respectively associated with the vacuum chambers 28 and 30 and short loop sensors 46 and 48 also respectively associated with the vacuum chambers 28 and 30. In a conventional manner, each of the sensors 42, 44, 46 and 48 may include a plurality of sensors, the reel control system 36 attempts to maintain the tape loop 32 in the optimum range about the long and short loop sensors 42 and 46. In similar fashion the system 40 responds to signals from the sensors 44 and 48 to maintain the loop 34 within an optimum range. The control system 40 is shown in simplified form as including a switch 50 for coupling the motor 38 between ground and a negative voltage or current source 52 and a switch 54 for coupling the motor 38 between ground and a positive voltage or current source 56. The switches 50 and 54 are responsive respectively to the short and long loop sensors 48 and 44. Though not specifically shown in the simplified representation of FIG. 1, the reel control systems 36, 40 may be responsive to tape or reel and capstan motor drive conditions on either side of the tape loop.

Although not shown in FIG. 1 since the system 40 thereof is greatly simplified, the reel drive systems comprise circuitry capable of driving reel motor 38 so as to make an appropriate loop correction as determined by the direction of movement of the magnetic tape 16 and the position of the tape loop 34 within the chamber 30. The tape 16 may be driven bidirectionally during normaly programming operation. Thus if the tape 16 is travelling in a direction from left to right as seen in FIG. 1 so as to unwind from the reel 12 and be wound on the reel 14, a long loop condition within the vacuum chamber 30 must result in a CCW acceleration of the motor 38 in order to allow the loop 34 to lengthen. Conversely if the tape 16 is travelling in a direction from right to left as seen in FIG. 1 a short loop condition within the chamber 30 must result in CW acceleration of the motor 38. The reel control systems 36 and 40 are also responsive to external command signals. During normal programming operation the capstan 20 drives the tape 16 bidirectionally past the heads 22 to perform various reading and writing operations as desired. The reel control systems 36 and 40 may respond to external command signals as well as tape velocity conditions and sensors 42, 44, 46 and 48 to maintain the loops 32 and 34 within the optimum ranges. During normal programming operation it is typically required that the reel motors such as the motor 38 produce a substantial amount of torque at relatively slow speeds. On the other hand rewind characteristically requires less torque and a higher operating speed. As will become apparent from the discussion to follow the torque constant of each reel motor should have a relatively high value for normal programming operation and a relatively low value, which is a small fraction of the high value, for rewind if the transport system 10 is to operate in an effective and efficient manner.

These principles which are applicable to the reel drive systems 36, 40 are similarly applicable to the capstan drive system 21. For a fixed torque constant, a trade-off must be accepted between high currents for high acceleration and high voltages for fast rewind.

As previously noted the motor torque constant $K_T$ is the number of inch-ounces of torque at the motor shaft per ampere of armature current. The motor constant $K_B$ which is the number of volts output per thousand revolutions per minute of the motor is generally related to $K_T$ by the equation $K_B = 0.729\ K_T$. Motor armature voltage, $V_M$, may be expressed by the equation:

$$V_M = K_B f + I_A R_A + L \frac{dI_a}{dt} \quad (1)$$

where $f$ is the motor speed in thousands of revolutions per minute, $I_A$ is the motor current in amperes, $R_A$ is the motor resistance in ohms and L is the motor inductance in henries. For a condition of low load and low friction the latter two terms of the equation are small and can be neglected, in which event:

$$V_M \approx K_B f \quad (2)$$

In a typical tape transport system 10 each of the voltage sources 52 and 56 of reel control system 40 provides 32 volts. If a reel motor speed of 800 rpm is arbitrarily chosen, then:

$$K_B = \frac{V_M}{f} = \frac{32}{.8} = 40 \; \frac{\text{volts}}{K \text{ rpm}} \quad (3)$$

Since $K_B = 0.729\ K_T$, then a $K_B$ of 35 (volts/K rpm) means that the torque constant $K_T$ will be about 50 (in-ounces/amp). Motor torque may be expressed by the equation:

$$T = K_T I_A \quad (4)$$

where $T$ is the motor torque in inch-ounces, $K_T$ is the torque constant in inch-ounces per ampere and $I_A$ is the motor current in amperes. Experience dictates that a reel motor torque on the order of 700 inch-ounces is required for normal programming operation speeds on the order of 200 inches per second. Since $T = K_T I_A$, then $$I_A = \frac{T}{K_T} = \frac{700}{50} = 14 \text{ amperes.}$$

Experience also dictates that motor resistance $R_A$ will be on the order of 0.7 ohm. Therefore $I_A R_A$ = approximately 10 volts. Neglecting the term L di/dt and estimating the motor speed to be 800 rpm for the empty reel tape speed of 200 ips, the motor voltage $V_M$ is an follows:

$$V_M = K_B f + I_A R_A = (35)\ (0.8) + (14)\ (0.7) = 28 + 10 = 38 \text{ volts} \quad (5)$$

A total voltage of 42 volts is much too high for a reel drive circuit designed for 32 volt operation, perticularly because of the inability of most power amplifiers and the included transistors therein to handle a voltage this large. It can thus be seen that with a fixed value of motor torque constant involved, optimum motor design for rewind can very well result in a difficult or impossible situation when it comes to normal programming operation.

One possible way of reducing the maximum voltage is to use a motor having a lower value of $K_B$ which in turn reduces $K_T$. Thus if a motor of the same family having a $K_B$ of about 27 volts/K rpm is chosen, $K_T$ then becomes about 40 (in-ounce/amp.) which makes $I_A$ about 17.5 amperes. In most motors $R_A$ will decrease to about 0.45 ohms as $K_T$ decreases to 40 (in.-ounce/amp.), and therefore:

$$V_M = K_B f + I_A R_A = (27)(0.8) + (17.5)(0.45) = 21.6 + 8 = 29.6 \text{ volts} \quad (6)$$

This shows that under proper circumstances the reduction of the torque constant $K_T$ results in the reduction of the maximum voltage. However as will be seen from the discussion to follow such reductions of $K_T$ reduce overall system performance and efficiency as well.

Calculations of the above type can be made for a given transport system until a value of $K_T$ is arrived at which will allow the full high speed rewind rpm requirement with the required torque for normal programming operation. Typical values used comprise a reel motor voltage $V_M$ of 37.5 volts, a torque constant $K_T$ of about 40 (in.-ounce/amp.) and a motor constant $K_B$ of about 29 volts/K rpm.

These are typical figures used for a tape transport system having a nominal programming speed of about 200 inches per second. Based on these figures which optimize performance during normal or programming operation, the motor performance during rewind can be predicted. Experience dictates that during rewind a torque of approximately 80 inch-ounce will be needed. This is made up of about 40 inch-ounce for tape tension torque, about 20 inch-ounce for friction in the motor and about 20 inch-ounce for miscellaneous losses. Since $T = K_T I_A$, then:

$$I_A = \frac{T}{K_T} = \frac{80}{40} = 2 \text{ amperes.} \quad (7)$$

Since $V_M = K_B f + I_A R_A$, then:

$$V_M = 37.5 = (29)\ (f) + (2)\ (1), \text{ and } K_B f = 35.5 \quad (8)$$

Therefore $f = K_B/35.5 = 29/\mathbf{35.5} = 1.2$ K rpm at high speed rewind. Mechanical requirements dictate that a tape speed of 1 inch per second will require a motor speed of approximately 4 rpm for an empty reel. Therefore 1.2K/4 = 300 inches per second. This is not a very good rewind speed in systems of this type where rewind speeds on the order of 640 inches per second or greater are expected.

It was previously shown that motor speed can be increased during rewind at the expense of an increase in the supply voltage. Accordingly one solution to the problem of motor performance is to make more supply voltage available during rewind. This can be accomplished by adding a switch between the power supply circuits and the reel motor. For example in the tape transport system of FIG. 1 the voltage source 52 could be arranged to be selectively coupled to the ground side of the motor 38, thereby making twice the normal supply voltage available. If each voltage source 52 and 56 provides 37 volts, then 74 volts would be available to drive the motor. Calculations show that this would provide a rewind speed on the order of 680 inches per second which is considerably better than the previous figure arrived at. However experience dictates that about 700 inch-ounce of torque would be needed, and accordingly the required normal programming acceleration current would be on the order of 17.5 amperes. A current of this size requires a number of large and expensive power transistors or a switching relay. However while the switching relay is typically less expensive than the needed power transistors such relays typically introduce highly undesirable current and voltage spikes.

A further alternative which may be utilized is to make two reel control circuits of the type shown in FIG. 1 available to supply each motor. This arrangement (commonly called a "bridge") makes available twice the voltage which would otherwise be available. However the added expense of an extra circuit in association with each reel motor usually proves prohibitive.

The various alternatives discussed thus far assume use of a motor of fixed toque constant and attempt to accommodate the varying voltage and current conditions required to achieve reasonable performance during both normal operation and rewind from such motors.

A different approach involves use of a motor having a variable torque constant. Direct current reel motors in which the field is generated by a permanent magnet have a fixed torque constant which is determined by the permanent magnet and which cannot be changed. However in the case of certain reel motors of the wound field type it has been found that the torque constant can be varied over a limited range, typically on the order of 3:1 or in some extreme cases 4:1 where efficient performance can be sacrificed. Thus wound field reel motors are available in which a torque constant on the order of about 40 (in-ounce)/amp. can be reduced to 13 or 14 during rewind. In such cases $K_B$ which may be on the order of 28 volts/K rpm can be reduced to about 9 or 10 volts/K rpm. This implies a maximum rewind speed of at least three times the speed of normal operation. However, since about 80 inch-ounce of torque are needed for rewind, it turns out that a current of approximately 6 amperes is needed. Thus, if the proper values are inserted in the above equations, f is calculated to be on the order of 3.47 K rpm, which is sufficient to provide a rewind speed on the order of 870 inches per second. This is adequate for most present high performance tape transport systems, but additional circuitry and power is needed to supply the wound field current required. In some cases a variable torque constant wound field motor is preferred over a fixed torque constant motor because of the slightly lower cost involved. The relay or other switching device required to switch wound field motors of this type is considerably less expensive than the high power relays which may be required with motors of fixed torque constant. In any event the reel drive motors of prior art tape transport systems, fixed torque constant or otherwise, involve significant sacrifices in the form of added circuitry and expense as well as in actual motor performance.

Figures 2, 3:
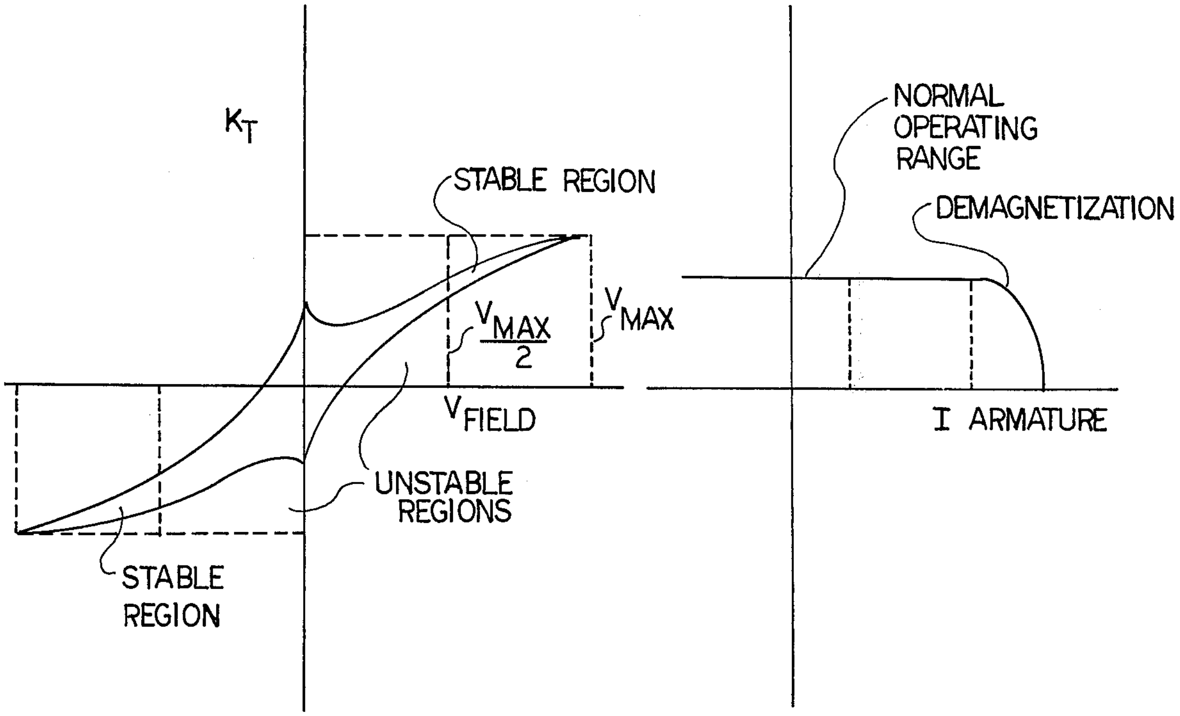
FIG. 2 is a characteristic curve of torque constant for a wound field direct current motor.
FIG. 3 illustrates the torque constant characteristic of a typical permanent magnet direct current motor.

One problem involved in use of variable torque constant wound field motors relates to the instability of such motors throughout a certain range of operation. A curve representing the varation of torque constant with field voltage for wound field motors of this type is illustrated in FIG. 2. It will be seen from the curves that when the voltage is at an optimum positive or negative value the motor is operating at one or the other of the opposite tips of the curve and the torque constant has a maximum value. As the field voltage decreases from the optimum value motor performance is represented by one or the other of two relatively closely spaced curves, again providing for reasonably stable operation as the torque constant is decreased. Accordingly reasonably stable operation can be expected in the range + ½ V max. to + V max. and − ½ V max. to − V max. However if the field voltage is less than ± ½ V max. the characteristic curves greatly separate from one another and motor performance may follow either of the curves or lie somewhere in between. This region between approximately $+ \frac{1}{2} V_{max.}$ and $- \frac{1}{2} V_{max.}$ must be considered unstable since the torque constant as well as the actual operation of the motor is unpredictable within this region.

Such instabilities are not a problem in permanent magnet motors, a typical torque constant characteristic of which is shown in FIG. 3. As shown in FIG. 3 as armature current increases the torque constant of a permanent field motor remains substantially constant within a normal operating range and far beyond until the armature current becomes so great that the magnetic field generated thereby exceeds the coercive force of the field magnet, causing demagnetization. If this demagnetization occurs the motor is rendered inoperable. However, these motors are designed such that the armature current required for demagnetization is typically six times larger than that which will be encountered during normal operation and the torque constant remains constant over the normal operating range of the motor. Of course, as previously noted motors of any kind having a fixed torque constant make it difficult to optimize performance of the tape transport system of both normal operating speeds and rewind speeds, especially in the absence of additional circuitry.

One important feature of tape transport systems having permanent magnet motors is the ability to provide dynamic braking of the capstan and reel motors. Thus in the event of a power failure a certain amount of dynamic braking is highly desirable or necessary to prevent tape breakage or other system malfunction. In the case of permanent magnet motors it is a relatively simple matter of adding a small amount of circuitry which will short circuit the motor or otherwise cause it to decelerate at a controlled rate. In a wound field motor however a power failure completely eliminates the field. In order to preserve the field for a time long enough to permit controlled deceleration it is typically necessary that expensive circuitry including bulky storage capacitors be added. Thus in the case of wound field motors dynamic braking is possible, but only with added expense and complexity.

Tape transports having direct current capstan and reel motors in accordance with the present invention eliminate most of the problems of prior art motors noted above by advantageously employing two or more separate field generating means so as to vary the torque constant without significant change in motor power consumption while at the same time providing dynamic braking and other desirable features. Expensive and complex switching circuitry or additional power supply circuitry is not necessary since current and voltage requirements are generally stabilized.

Figure 4:
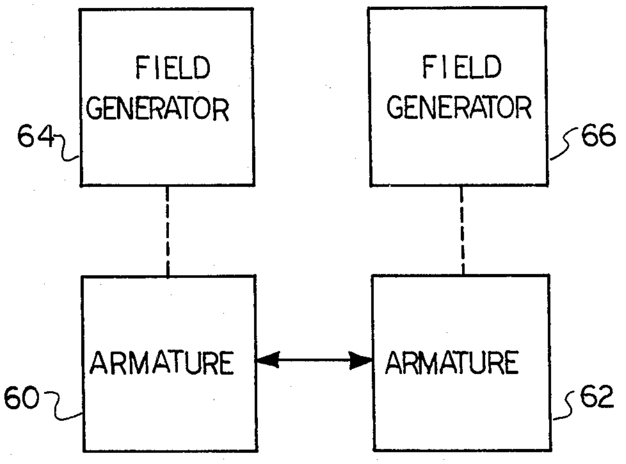
FIG. 4 is a block diagram of the basic components of a motor for use in accordance with the invention.

FIG. 4 illustrates a hybrid motor suitable for use in the present invention in basic block diagram form. The motor includes armature means which is illustrated in FIG. 4 as comprising separate armatures 60 and 62 although as shown and described hereafter a single armature can be used where appropriate. Where two or more armatures are used as in the case of FIG. 4 such armatures are coupled together in series so as to share a common armature current. Motors in accordance with the invention include two or more field generating means. The example of FIG. 4 includes a pair of field generators 64 and 66 respectively associated with the armatures 60 and 62. Where the armature means comprises a single armature, such single armature is shared by the field generators 64 and 66. The field generators 64 and 66 interact with the armatures 60 and 62 to produce rotational motion of the motor. As is the case with most motors the armatures 60 and 62 can be included as a part of either the rotor portion or the stator portion of the motor in which event the field generators 64 and 66 comprise part of the stator portion or the rotor portion respectively.

In motors according to the invention at least one but not all of the field generating means are used to provide a field of substantially constant magnitude and sense during motor operation. In the example of FIG. 4 the field generator 64 provides such a field. The generator 64 may comprise a permanent magnet, or it may comprise a wound field type of winding in which event a substantially constant current is used to energize such winding. In motors of the invention one or more of the field generating means not used to provide the fixed field are employed to provide a variable field which combines with the fixed field to produce a changeable net effect. In the example of FIG. 4 the field generator 66 comprises the variable portion of the field generating means, and typically assumes the form of a wound field type winding which can be energized with currents of different value or opposite sense. Thus the field generator 66 can be selectively energized with direct currents of the same sense but different magnitude. This results in the generation of two different fields which combine with the fixed field from the generator 64 to provide a total field strength at the armatures 60 and 62 which is variable between two different values. The torque constant of the motor therefore assumes different values depending upon which level of current is used to energize the field generator 66. A more desirable arrangement for many applications is to alternately energize the winding comprising the field generator 66 with currents of equal magnitude but opposite sense. In such arrangements the effects of the fields produced by the generator 66 algebraically combine with the effects of the fixed field from the generator 64 to again produce two different and alternative fields at the armatures 60 and 62. The motor torque constant varies between two different values depending upon whether the generator 66 is being energized by a positive current or a negative current. At the same time the overall power consumption of the motor remains relatively constant since the field generator 66 draws the same magnitude of current for either torque constant. The field generator 64 draws a constant amount of current in the case of a wound field type winding, and draws no current in the case of a permanent magnet. As discussed below the field generator 64 preferably comprises a permanent magnet so as to reduce the overall power requirements of the motor as well as to provide dynamic braking without the need for external power for maintaining the field of the generator 66.

Figure 5:
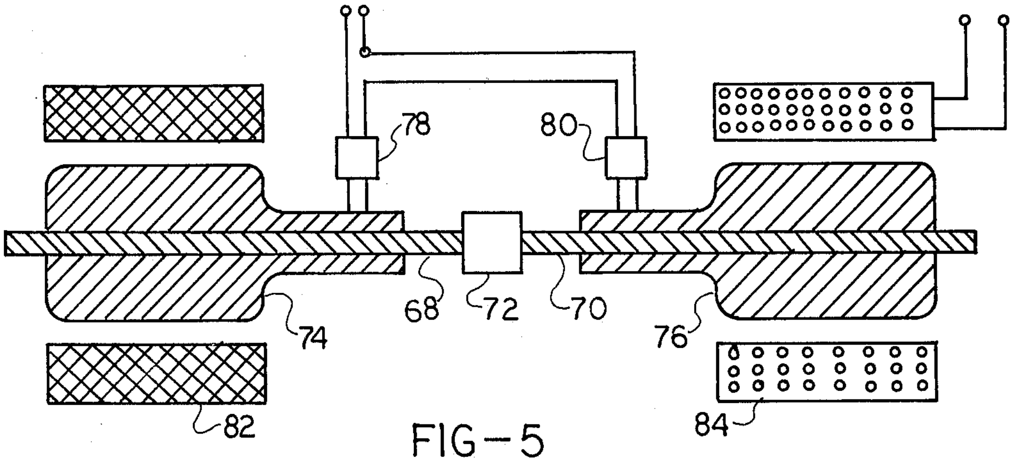
FIG. 5 is a sectional view of one arrangement of a motor for use in accordance with the invention.

One particular arrangement of a motor in accordance with the invention is illustrated in FIG. 5. The motor of FIG. 5 includes separate rotatable shafts 68 and 70 coupled together through a gear box 72. Armatures 74 and 76 are respectively mounted on the shafts 68 and 70 for rotation therewith. The windings comprising the armatures 74 and 76 are respectively energized through commutators 78 and 80 coupled in series to a source of armature current. The armatures 74 and 76 respectively correspond to the armatures 60 and 62 of FIG. 4. The stator portion of the motor of FIG. 5 includes a pair of field generators 82 and 84 respectively associated with the armatures 74 and 76 and respectively corresponding to the generators 64 and 66 of FIG. 4. The field generator 82 which interacts with the armature 74 in conventional motor fashion produces a field of fixed value, and preferably comprises a permanent magnet although a wound field type of winding can also be used. On the other hand the field generator 84 comprises a winding which is selectively energized by currents of different value to provide different fields at the armature 76.

The torque constant of the hybrid motor shown in FIG. 5 varies between two different values depending upon the one of the two different currents used to energize the winding 84. Thus where currents of equal magnitude but opposite sense are used, a a current of one sense when applied to the winding 84 will produce a field effect at the armature 76 tending to aid or add to the effect of the field produced on the armature 74 by the field generator 82. Conversely a current of opposite sense applied to the winding 84 will have an effect on the armature 76 which opposes the effect on the armature 74 so as to produce a torque constant of lower value. Where currents of different value are alternatively applied to the winding 84 the resulting different fields produce different effects which combine with the fixed field effect on the armature 74 to produce different torque constants.

Where the field generators 82 and 84 are both used to drive the motor of FIG. 5, the gear box 72 is eliminated and the separate shafts 68 and 70 are coupled together so as to comprise a single shaft. In certain instances however it may be desirable to use one of the field generators 82 and 84 only as a brake. In such instances the gear box 72 is required in order to provide an appropriate gear ratio between the shafts 68 and 70 in order to gear down the "braking" shaft which is rotating at a relatively high speed whenever the associated field winding is energized to effect braking.

Figure 6:
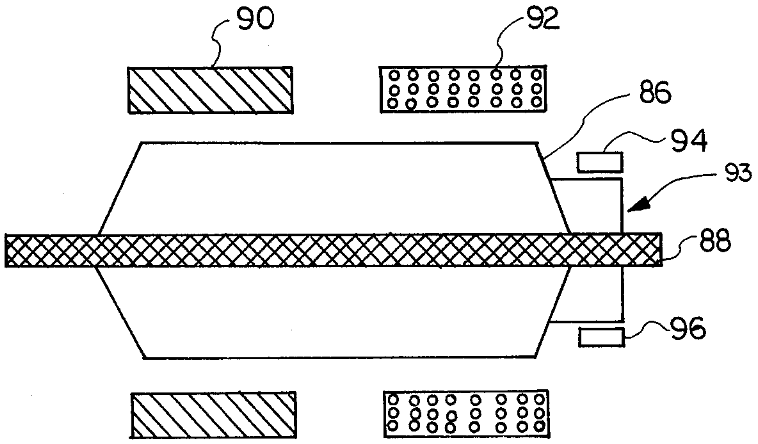
FIG. 6 is a sectional view of a preferred arrangement of a motor for use in accordance with the invention.

Another preferred arrangement of a motor for use in accordance with the invention is illustrated in FIG. 6. In the motor of FIG. 6 the armatures 60 and 62 of FIG. 4 are combined into a single armature winding 86 comprising the rotor portion of the motor which includes a rotatable shaft 88 having the armature 86 mounted thereon. A stator portion of the motor includes a first, permanent magnet field generator 90 and a second, wound field generator 92. The field generators 90, 92 generate a field magnetic flux which interacts with the armature 86 to rotationally drive the armature in a conventional manner. The wound field generator 92 may be energized with a selectively variable voltage or current to vary the magnetic field and, as a result, the torque constant of the motor. Commutator 93 provides connection to a non-rotating 94, 96 electrical source for energization of the armature 86. In an alternative arrangement the field generators 90, 92 may be mounted on the shaft 88 to form the rotor and the armature 86 may form the stator.

Figure 7:
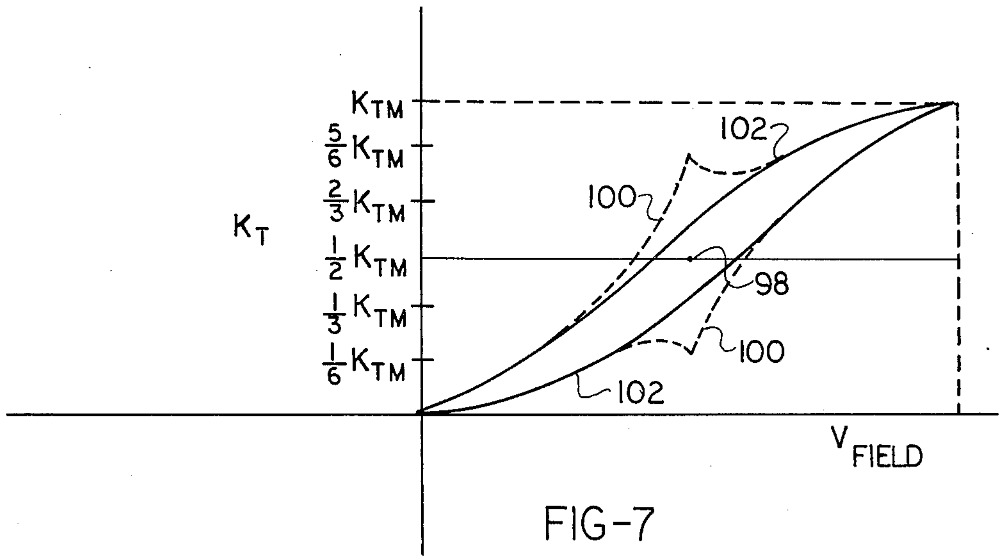
FIG. 7 is a characteristic curve of torque constant of a motor for use in accordance with the invention.

The torque constant characteristics of wound field and permanent magnet direct current motors were previously discussed in conjunction with FIGS. 2 and 3. In hybrid motors of the invention such as in the motor of FIG. 6 which includes a permanent magnet field and a wound field, the two different field generators combine to produce a torque constant characteristic as shown in FIG. 7. The fixed portion of the torque constant attributed by the flux component of the permanent magnet and represented by a line 98 in FIG. 7 combines with the characteristic provided by the wound flux component of the field and illustrated by the dashed curve 100 to produce a combined characteristic illustrated by the solid line 102. The curve 102 which depicts a much more predictable operation than the curve 100 is due in part to the combined effect of the permanent magnet and in part to the fact that the motor is operating in a relatively high flux state at all times. Accordingly motor operation is predictable for all values of the field voltage between zero and the maximum value, and practically any value of torque constant available within the range of values for the field voltage can be selected.

The range of possible torque constants is arbitrarily divided into six different increments with "$K_{TM}$" representing the maximum possible torque constant which occurs at the maximum field voltage. It will be seen that in motors in accordance with the invention practically any desired ratio of maximum to minimum torque constants is possible. For example assume that calculations dictate a motor torque constant during rewind which is one-sixth the value of torque constant during normal operation. Therefore:

Permanent magnet factor + wound field factor = 6
Permanent magnet factor − wound field factor = 1
Twice the permanent magnet factor = 6+1 = 7
The permanent magnet factor = 3.5; and
The wound field factor = 6−1/2 = 2.5

Accordingly the torque constant contributed by the permanent magnet portion of the motor is made to equal about 58.5% of the total torque constant, while the torque constant contributed by the wound field portion is made to equal about 41.5% of the total torque constant. Thus when the wound field is energized in one sense to aid the permanent magnet field the torque constant is 58.5% + 41.5% or 100% of $K_T$. When the wound field is energized in the opposite sense to oppose the permanent magnetic field the torque constant is 58.5% − 41.5% or about 17% of $K_T$ or 1/6 $K_T$.

It has been found that with a supply voltage of about 37 volts available, reel motors in accordance with the invention can be installed in relatively high performance tape transports to provide speeds on the order of 340 inches per second during normal operation. This would appear to dictate a maximum rewind speed on the order of 2040 inches per second. However since the current requirement increases as the torque constant decreases the maximum rewind speed is actually more on the order of 1600 inches per second.

In designing a transport system a number of factors must be considered including capstan and reel motor selection, power amplifier dissipation and cost, and required power supply. There are many other parameters whose effects must be investigated, but those which most often seem to be involved in practical limiting situations include the desired programming speed range, the amount of vacuum chamber storage, the ratio of rewind speed to normal programming speed, the total power input to the transport system, the motor dissipation and the servo amplifier dissipation.

Figure 8:
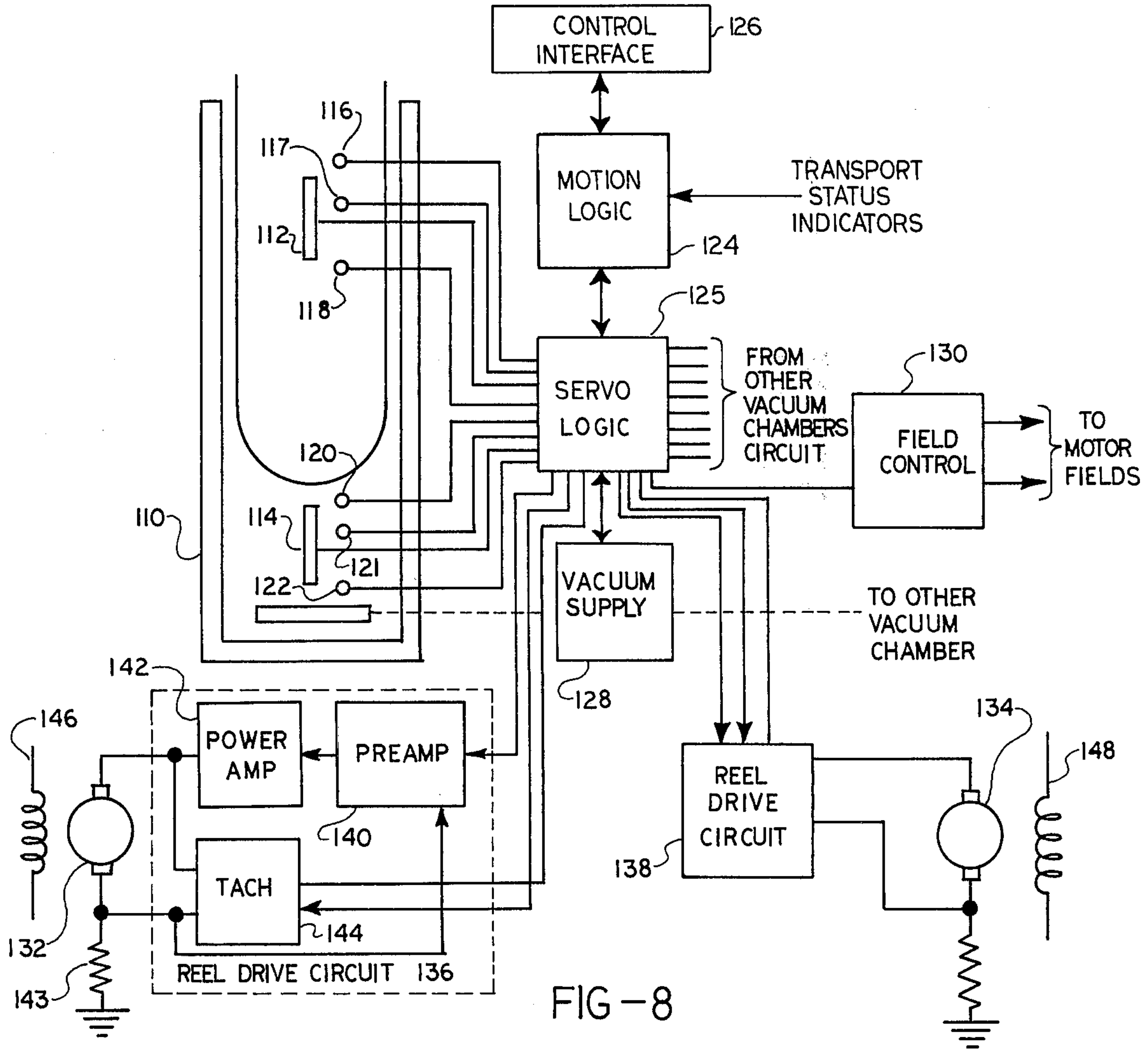
FIG. 8 is a partial plan view and partial block diagram of a reel control circuit which may be used to control motors in accordance with the invention.

The advantages of tape transports having motors with multiple field generators in accordance with the invention can be better appreciated by considering an example of a reel control system for a relatively high performance tape transport system with different types of motors used as the reel drive motors. The tape transport system is illustrated in part in FIG. 8 and includes a pair of vacuum chambers, one chamber 110 of which is shown in FIG. 8 as including a pair of relatively short, spaced apart linear sensors 112 and 114 and a plurality of point sensors 116, 118, 120 and 122 positioned approximately at the extemes of the linear sensors 112, 114, and point sensors 117, 121 positioned approximately midway on the linear sensors 112, 114. Motion control logic 124, which is coupled through a control interface 126 to data processing equipment and other sources of external commands, responds to the positions of tape loops within the chamber 110 and the other chamber (not shown), to capstan commands and to interface commands to drive the tape reels in appropriate fashion. The spaced linear sensors 112 and 114 provide rate control, while the point sensors 116, 117, 118, 120, 121 and 122 provide position control. The motion control logic 124 also controls logic 124 also controls a vacuum supply 128 for the vacuum chambers as well as a field control 130. The field control 130, which may be of conventional design, is operative to change the torque constant during rewind in cases where a variable torque constant motor is used.

The transport system of FIG. 8 includes a pair of reel drive motors 132 and 134 coupled to be respectively controlled by a pair of reel drive circuits 136 and 138 in response to signals from the servo logic 125. As shown in the case of the reel drive circuit 136, each of the circuits 136 and 138 includes a preamplifier 140 for initial amplification of the signals from the motion control logic 124, a power amplifier 142 for further amplification, a current sensing resistor 143 connected in series with the motor armature and a tachometer 144 or velocity sensing circuit for monitoring the speed of the motors 132 and 134. Where the motors 132 and 134 comprise permanent magnet motors, the fields and thus the torque constants thereof are fixed. Where the motors 132 and 134 are of the wound field type or alternatively of the hybrid type in accordance with the invention, they respectively include at least one field winding 146 and 148 which is selectively energizable at different levels to vary the field and thereby the torque constant in response to the field control 130.

One example of a magnetic tape transport system of the type shown in FIG. 8 which was actually used to gather some of the data set forth hereafter was determined to have a number of basic characteristics when used with any type of reel motor. These characteristics included an empty reel system moment of inertia of 0.68 inch-ounce seconds$^2$, a full reel system moment of inertia of 1.79 inch-ounce seconds$^2$, an empty reel radius of 2.5 inches, a full reel radius of 5 inches, a 125 ips normal programming speed provided by an empty reel angular velocity of 50 radians per second and a full reel angular velocity of 25 radians per second, a required torque of 8 inch-ounce per inch of radius to handle tape tension, a required torque of 20 inch-ounce to handle motor friction, an available supply voltage of ± 28 volts DC, a motor figure of merit ($K_{T/R}{}^2$, where $K_T$ is the torque constant in inch-ounces per ampere and R is armature resistance in ohms) of 2700, and a programming or normal tape speed of 125 inches per second. The sensor logic in such system is such that the tape loops are driven back to the point position sensors 117, 121 with a small amount of speed error, and the tachometers enable the motors to be driven to a stop with active braking in the deadband between sensors 118 and 120.

The worst possible conditions under normal programming operation were observed. It was determined that such conditions required a torque constant of 64.6 (in.-ounce)/amp., an armature resistance of 1.54 ohms, a required armature current of 8.17 amperes, an armature $I^2R$ dissipation of 130 watts and a peak servo system dissipation of 228 watts with 110 watts being average. With the system thus optimized for normal programming operation, its performance during rewind was evaluated with three different types of motors used to drive the reels. The motors used included permanent magnetic motors, wound field motors and hybrid motors according to the invention. The following data in Table I was noted for the three different types of motors:

TABLE I

| Motor Type | Initial Rewind Speed | Final Rewind Speed | Peak Rewind Speed |
|---|---|---|---|
| Permanent Magnet | 142.4 ips | 145.8 ips | 227.6 ips |
| Wound Field | 353.5 ips | 382 ips | 580.7 ips |
| Hybrid | 470.5 ips | 605 ips | 850 ips |

| Motor Type | Average Rewind Speed | Rewind Torque Constant | Field Power |
|---|---|---|---|
| Permanent Magnet | 200 ips | 64.64 (in.-ounce/amp.) | 0 |
| Wound Field | 509 ips | 21.51 (in.-ounce/amp.) | 50 watts |
| Hybrid | 746 ips | 10.0 (in.-ounce/amp.) | 21 watts |

It will be seen that with conditions optimized for normal programming operation using each of the three types of motors, the hybrid motor of the present invention proved to have far superior performance during rewind. The initial and final rewind speeds as well as the peak and average rewind speeds were each higher in the case of the hybrid motors of the invention than in the case of the prior art permanent magnet and wound field motors. Moreover while the wound field motor required 50 watts of field power the hybrid motor of the invention required only 21 watts.

The next step in the analysis was to optimize tape transport performance for rewind operations, and then determine the power requirements of the motors. Using this approach the following data in Table II and Table III was gathered:

TABLE II

| Motor Type | Normal Torque Constant | Torque Constant During Rewind | Average Rewind Speed |
|---|---|---|---|
| Permanent Magnet | 10.5 (in.-ounce/amp.) | 10.5 (in.-ounce/amp.) | 762 ips |
| Wound Field | 31.5 (in.-ounce/amp.) | 10.5 (in.-ounce/amp.) | 750 ips |
| Hybrid | 64.6 (in.-ounce/amp.) | 10.5 (in.-ounce/amp.) | 746 ips |

TABLE III

| Motor Type | Average Servo System Power Required | Peak Servo System Power Required | Armature Current Power Required | Field Power Required |
|---|---|---|---|---|
| Permanent Magnet | 1000 watts | 1100 watts | 50.3 amperes | 0 |
| Wound Field | 300 watts | 400 watts | 16.85 amperes | 50 watts |
| Hybrid | 105 watts | 228 watts | 8.17 amperes | 21 watts |

Again it will be appreciated that hybrid motors in accordance with the invention enable optimization of operation of the transport system during both normal programming and rewind while using considerably less power than is required by permanent magnet motors and wound field motors.

As noted earlier the high current and voltage requirements of prior art motors to produce relatively high rewind speeds can sometimes be met by making certain additions to the system. In the present example, the next step of the analysis was to add a switching relay so as to be able to couple the normally grounded side of the motor to one of the voltage sources of the power supply during rewind and thereby double the available voltage across the motor armature. With this modification made the following data in Table IV was collected:

TABLE IV

| Motor Type | Normal Torque Constant | Torque Constant During Rewind | Effective Torque Constant After Switching of Relay |
|---|---|---|---|
| Permanent Magnet | 21 (in.-ounce/amp.) | 21 (in.-ounce/amp.) | 10.5 (in.-ounce/amp.) |
| Wound Field | 63.5 (in.-ounce/amp.) | 21.5 (in.-ounce/amp.) | 10.55 (in.-ounce/amp.) |
| Hybrid | 64.6 (in.-ounce/amp.) | 10.5 (in.-ounce/amp.) | |

| Motor Type | Average Rewind Speed | Peak Servo Power Required | Average Servo Power Required |
|---|---|---|---|
| Permanent Magnet | 762 ips | > 700 watts | > 400 watts |
| Wound Field | 760 ips | > 230 watts | > 106 watts |
| Hybrid | 746 ips | about 105 watts | about 105 watts |

| Motor Type | Armature Current Required | Field Power | Relay Power |
|---|---|---|---|
| Permanent Magnet | 25.1 amps. | 0 | 2 watts |
| Wound Field | 8.31 amps. | 50 watts | 2 watts |
| Hybrid | 8.17 amps. | 21 watts | |

It will be noted that hybrid motors in accordance with the invention as combined with an amplifier are less complex and require less power input than either of the wound field or permanent magnet type motors. The hybrid motor is also more reliable in view of the fewer components thereof and particularly in view of the fact that a switching relay is not required. Moreover, even though use of a switching relay results in a substantial reduction in dissipated power of the servo amplifier for both the permanent magnet motor and the wound field motor, the permanent magnet motor requires approximately three times the number of power transistors to handle the higher required current as compared with wound field motors or the hybrid motors of the invention. Of course the wound field and permanent magnet motors still require the additional relay, while the hybrid motors do not.

The reduction of the torque constant for high speed rewind reduces the maximum rate of acceleration and deceleration. It is therefore advisable to accelerate rapidly to the normal program operation speed using the higher torque constant and then gradually reduce the torque constant after the normal programming speed has been reached. Similarly, during deceleration, the torque constant is advantageously gradually increased to the higher value as the normal programming speed is reached. In this way advantage can be taken of both rapid acceleration and relatively high maximum speed.

As discussed previously, the relationship between armature voltage and current is represented by the equations.

$$V = RI + K_B f + L\frac{di}{dt,} \quad (9)$$

or assuming, full torque for rewind acceleration, $V = V_M$, $K_B = 0.729\ K_T$ and $Ldi/dt$ = approximately zero. The equation for maximum armature voltage then becomes, $$V_M = RI + 0.729 K_T f \quad (10)$$

and solving for armature current, $$I = \frac{V_M - 0.729\ K_T f}{R} \quad (11)$$

torque, $T = K_T I$ then becomes $$T = \frac{K_T V_M - 0.729\ K_T^2 f}{R} \quad (12)$$

T is maximized with respect to the torque constant by setting the drivative equal to zero. At maximum torque, $T_M$, $$\frac{dT}{dK_T} = \frac{V_M - 1.558\ K_T f}{R} = O, \quad (13)$$

$$\text{and } K_T = \frac{V_M}{1{:}558\, f} \quad (14)$$

$$\text{or } K_T f = 0.642\ V_M = \text{Product Constant} \quad (15)$$

Continuing the example where normal programming speed is 125 ips, nominal rewind speed is 750 ips, reel radius $R$ = 2.5 inches, 3.75 inches and 5 inches for empty, half full and full reels respectively, the rotational reel speeds, $f$, and torque constants, $K_T$, for maximum torque are calculated as follows:

125 ips

Empty Reel $$f_1 = \frac{(125)\ (60)}{(2.5)\ (2\pi)} = 0.477\ KRPM \quad (16)$$

$$K_T = \frac{28}{(1.558)\ (0.477)} = 37.7\ \frac{\text{in-oz}}{\text{amp.}} \quad (17)$$

Half Full Reel $$f_1 = \frac{(125)\ (60)}{(3.75)\ (2\pi)} = 0.318\ KRPM \quad (18)$$

$$K_T = \frac{28}{(1.588)\ (0.318)} = 56.6\ \frac{\text{in-oz}}{\text{amp.}} \quad (19)$$

Full Reel $$f_1 = \frac{(125)\ (60)}{(5)\ (2\pi)} = 0.239\ KRPM \quad (20)$$

$$K_T = \frac{28}{(1.588)\ (0.239)} = 75.3\ \frac{\text{in-oz}}{\text{amp.}} \quad (21)$$

750 ips

Empty Reel $$f_2 = \frac{(750)\ (60)}{(2.5)\ (2\pi)} = 2.86\ KRPM \quad (22)$$

$$K_T = \frac{28}{(1.558)\ (2.86)} = 6.28\ \frac{\text{in-oz}}{\text{amp.}} \quad (23)$$

Half Full Reel $$f_2 = \frac{(750)\ (60)}{(3.75)\ (2\pi)} = 1.91\ KRPM \quad (24)$$

$$K_T = \frac{28}{(1.558)\ (1.91)} = 9.40\ \frac{\text{in-oz}}{\text{amp.}} \quad (25)$$

Full Reel $$f_2 = \frac{(750)\ (60)}{(5)\ (2\pi)} = 1.43\ KRPM \quad (26)$$

$$K_T = \frac{28}{(1.558)\ (1.43)} = 12.56\ \frac{\text{in-oz}}{\text{amp.}} \quad (27)$$

It can thus be seen that the torque constant, $K_T$, for maximizing torque at a given speed varies considerably with reel pack. However, for present day tape transports, it is more economical to use a slightly larger reel motor that is sometimes driven under less than optimum conditions than to sense reel pack and vary the torque constant with reel pack. Furthermore, it is acceleration that should actually be maximized. Because of the greater inertia of a full reel, acceleration is maximized by maximizing torque for a full reel. An empty reel thus receives less than maximum torque but can accelerate faster with a given motor torque because of the lower inertia.

To meet the requirements of normal programming the torque constant at 125 ips tape speed is selected to be 64.6 (in-oz)/amp. compared to an optimum torque constant of 75.3 (in-oz)/amp. for a full reel. Similarly, the torque constant at 750 ips is fixed at 10.5 (in-oz)/amp. compared to a value of 12.56 (in-oz)/amp. for maximum full reel torque. The selected value represents a compromise which permits a greater empty reel maximum rewind speed with a slight loss of full reel maximum torque at 750 ips.

It is thus seen that acceleration and deceleration may be optimized by changing the torque constant in a predetermined, controlled manner in accordance with the above relationships of equations (14) and (15). It has been further found that sudden, or step function changes in the field current may result in a momentary (and disastrous) excessive current and voltage in the armature windings and power amp. This condition can be avoided if the product of motor speed and torque constant is maintained generally equal to the "Product Constant" at program operation speeds as the motor is accelerated to or from higher speeds. A sudden increase in this product of speed and torque constant by a factor greater than two would result in the requirement of transistors in the armature energization circuit with excessively large collector-emitter breakdown voltages.

In a practical tape transport system excellent results are obtained by approximating the optimum torque constant-speed relationship with a ramp or linear function between the high torque constant and the low torque constant. Time t is thus proportional to both armature resistance R and the inertial load J. With the ideal torque variation approximated by a ramp function, a ramping time of $T = 1.5$ sec. provides excellent results for the described example. This is the approximate time required for acceleration from a normal programming speed of 125 ips to a nominal rewind speed of 750 ips.

An advantageous operating program thus operates in response to a rewind command to activate the rewind input RWD to reference current generator 152 as normal programming speed is reached and deactivated the signal RWD as deceleration begins.

Because the selected normal programming torque constant is less than the ideal full reel torque constant at a tape speed of 125 ips, improved rewind acceleration can be obtained by delaying the start of the torque constant ramp until the full reel accelerates to approximately 146 ips tape speed of 0.278 KRPM. This can be accomplished by sensing tape speed, by sensing motor speed or by providing a fixed time delay which is typical of the time required for acceleration to a tape speed approaching 144 ips. For acceleration from stand still the RWD signal (FIG. 9) can be activated when a tape speed of 146 ips is reached or after a fixed time delay which is normally required for a full reel to accelerate to 146 ips.

While the principals of determining the physical and operating characteristics of a tape transport motor control and operating characteristics of a tape transport motor control system in accordance with the invention have been discussed in the specific context of a reel motor control system, it will be appreciated that the same principals may be applied to the capstan motor system. A capstan motor system having a variable torque constant hybrid motor and a field control circuit which varies the field energization to control the torque constant in accordance with a predetermined non-step function or in accordance with selected sensed parameters of the transport (loop position) may thus be used in a tape transport according to this invention.

Figures 9, 10, 11:
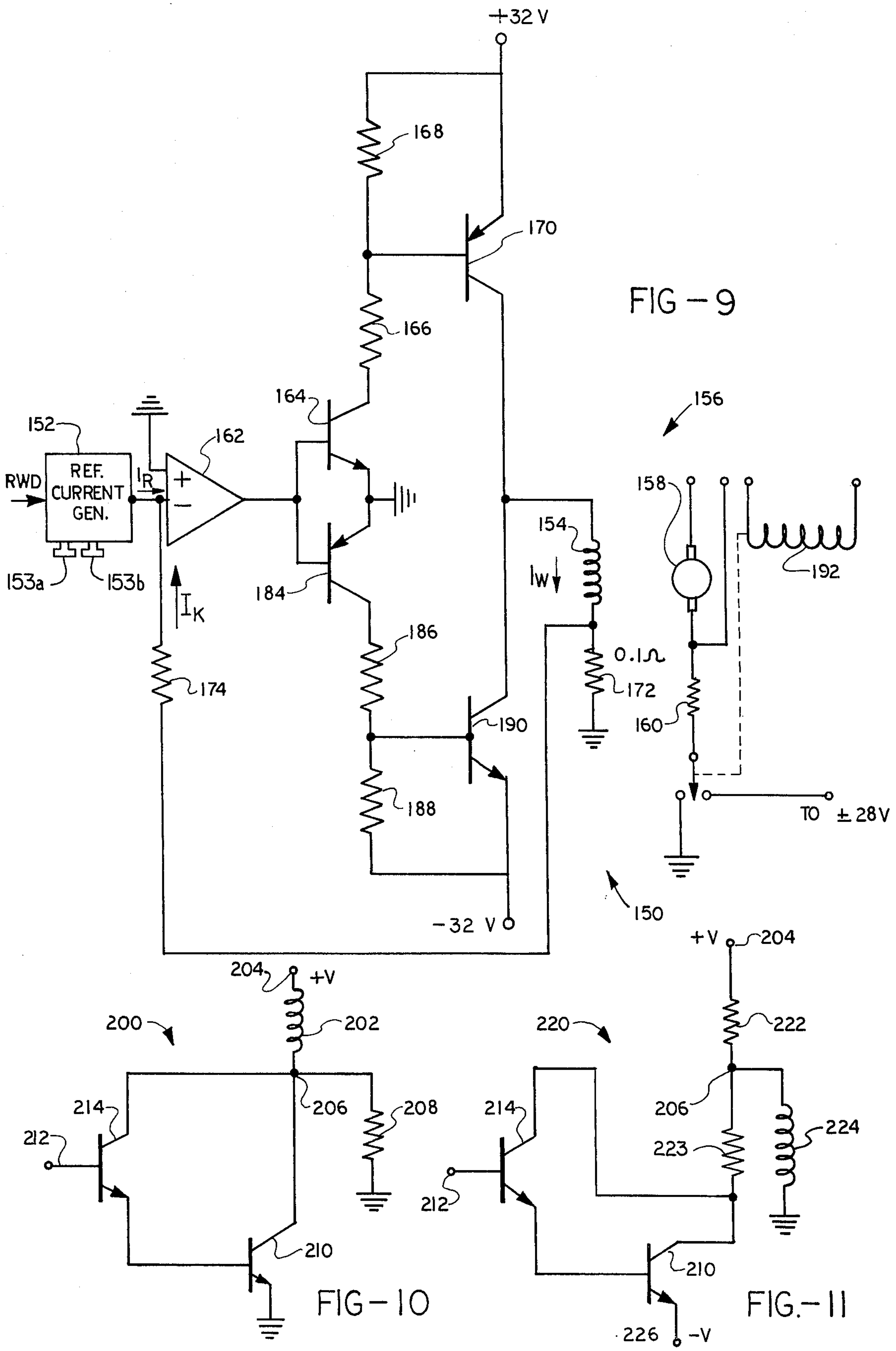
FIG. 9 is a schematic diagram of a drive circuit which may be used to drive the field or armature of a motor according the invention.
FIG. 10 is a schematic diagram of a conventional circuit for changing the torque constant of a variable torque constant wound field motor.
FIG. 11 is a schematic diagram of the circuit of FIG. 9 as adapted to accomodate a motor in accordance with the invention.

A preferred energization circuit 150 for controlling the energization of a field winding, whether for a variable torque motor in accordance with this invention or a conventional motor is shown in FIG. 9. A reference current generator 152 having fine adjustment controls 153*a* and 153*b* (select in test resistors) responds to a rewind signal RWD which is conventionally generated to indicate a rewind mode of operation by generating a reference current for controlling field current $I_W$ through a field winding 154 of reel motor 156 having an armature 158 connected in series with a small current sensing resistor 160. Fine adjustment controls 153*a* and 153*b* may be potentiometers or similar circuit elements permitting fine adjustment of the normal programming and rewind reference currents $I_R$ respectively. These controls 153*a* and 153*b* permit the torque constants for the two modes of operation to be preset to within very close tolerances. With closer tolerances on the torque constants the servo control for the motor may be more closely "tuned" to attain better servo performance. The torque constants are sufficiently stable that once they are preadjusted via controls 153*a* and 153*b* they need not be adjusted on a regular basis. Reference current generator 152 further includes conventional circuitry, such as ramp generator circuitry causing the generator 152 to change current reference values in accordance with a predetermined function and hold the reference current $I_R$ constant once the commanded reference current is attained. In this example it is presumed that rewind always begins from capstan rest and that generator 152 responds to a false to true RWD signal transition with a delay required for a full reel to reach a tape speed of 144 ips and then a linear ramp which commands a change in motor constant from maximum $K_T$ to minimum $K_T$ over a time period of about 1.5 sec. An opposite polarity ramp is generated without delay in response to a true to false transition of signal RWD. The required delay characteristic can be accomplished by providing a single shot having the predetermined delay which is driven by RWD and has an output SSD. A conventional ramp generator may then be driven with the command signal RWDD = RWD · SSD. Alternatively, the required delay can be determined by sensing a reel velocity of 144 ips.

For instance, if reference current generator 152 generates a reference current of $I_R = -0.7$ ma in the absence of a "true" RWD signal, the output of an operational amplifier 162 having a negative input connected to receive $I_R$ is driven positive. An NPN transistor 164 has its base connected to the output of op amp 162, of op amp 162, its emitter connected to ground, and its collector connected through a 470 ohm resistor 166 and a 100 ohm resistor 168 to a +32 volt source. A PNP transistor 170 has its base connected to a common terminal of resistors 166 and 168, its emitter connected to the +32 volt source, and its collector connected to one terminal of field winding 154. When the output of op amp 162 goes positive, transistors 164 and 170 are turned on and current $I_W$ begins to flow through winding 154 in a direction tending to aid another magnetic field generating means such as a permanent magnet. As the field current $I_W$ reaches about 0.7 amperes, the voltage at a 0.1 ohm current sensing resistor 172 reaches 0.07 volts, causing a +0.07 ma current $I_K$ to flow through a 100 ohm resistor 174 to the negative input of op amp 162 to balance the $I_R$ reference current. As the reference current varies intermediate the extremes, $\pm I_R$, the field current will be approximately proportional to the reference current.

Reference current generator 152 responds to a true RWD signal by waiting the predetermined time period before generating a reference current which ramps toward $I_R$ instead of $-I_R$. This current activates a negative current portion of circuit 150 having a PNP transistor 184, resistors 186, 188 and an NPN transistor 190 connected as the mirror image of transistor 164, resistors 166, 168 and transistor 170, respectively. When the output of op amp 162 goes negative a field current $I_W = 0.7$ amperes is passed through winding 154. This current causes generation of a magnetic field opposing the first magnetic field to lower the effective torque constant $T_K$ for high speed rewind.

A relay 192 may be employed to control a switch 194 to selectively connect the armature 158 of motor 156 to go through resistor 160 to ground or to a ± 32 volt source. This permits an increase in armature voltage for high speed rewind where there is not an adequate decrease in the torque constant such as where a normal wound field motor is used in place of hybrid to permit 32 volts to be applied across the armature for both normal programmed operation and high speed rewind.

Where the motor armature 158 comprises a hybrid motor in accordance with the invention the relay 192 is not needed since the power requirements remain relatively constant and one terminal of armature 156 is continuously connected through current sensing resistor 160 to ground while the other terminal is continuously connected to power amplifier 150. Moreover the single field winding 154 can be adequately supplied with the much lower current required by a hybrid motor using a single power transistor 170 to supply positive current and a single power transistor 190 to supply negative current. In the case of a conventional wound field motor approximately ± 1.5 amps is needed for positive and negative field currents, respectively.

One form of field current switching circuit commonly used with conventional wound field motors is illustrated in FIG. 10. In the control circuit 200 of FIG. 10 a field winding 202 of the motor is coupled between a positive power supply terminal 204 and a terminal 206 which is grounded through a resistor 208 and selectively grounded through a transistor 210. Signals at an input terminal 212 as might be supplied by the motion control logic 124 of FIG. 8 control the conductivity of a transistor 214 which in turn controls the conductivity of the transistor 210. With the transistor 210 conducting the winding 202 is coupled directly to ground so as to have almost the full voltage from the terminal 204 thereacross. Alternatively when the signal at the input terminal 212 cuts off conduction of the transistor 214 and thereby the transistor 210, the winding 202 is coupled to ground only through the resistor 208 so as to have a smaller voltage drop thereacross. in ths way, the energization of the field winding 202 is varied so as to provide the two different values of motor torque constant.

Hybrid motors can be readily substituted into existing tape transport systems having switching circuits of the type illustrated in FIG. 10, with minor modification as seen in FIG. 11. The current control circuit 220 of FIG. 11 is similar to that of FIG. 10 except that the positions of the resistor and field winding are reversed. Thus the resistor 222 is coupled between the power supply terminal 204 and the terminal 206. Conversely a field winding 224 is of a hybrid motor in accordance with the invention is coupled between the terminal 206 and ground. A further difference lies in the fact that the emitter lead of the transistor 210 is coupled to a negative power supply terminal 226. When the transistor 210 conducts in response to a signal at the input terminal 212, the negative voltage from the terminal 226 appears at the terminal 206, causing a current to flow through the winding 224 in a direction from ground to the terminal 206. Conversely when the input signal at the terminal 212 turns off the transistors 210 and 214 a positive voltage appears at the terminal 206 causing current to flow in the reverse direction from the terminal 206 through the winding 224 to ground. By properly selecting the values of +V, −V and resistors 222, 223 the winding 224 is alternately energized in opposite senses and by equal amounts to provide the two different torque constants. The base input terminal 212 should be driven with a ramping current to prevent armature over voltage and optimize the torque constant during acceleration as discussed above.

Figure 12:
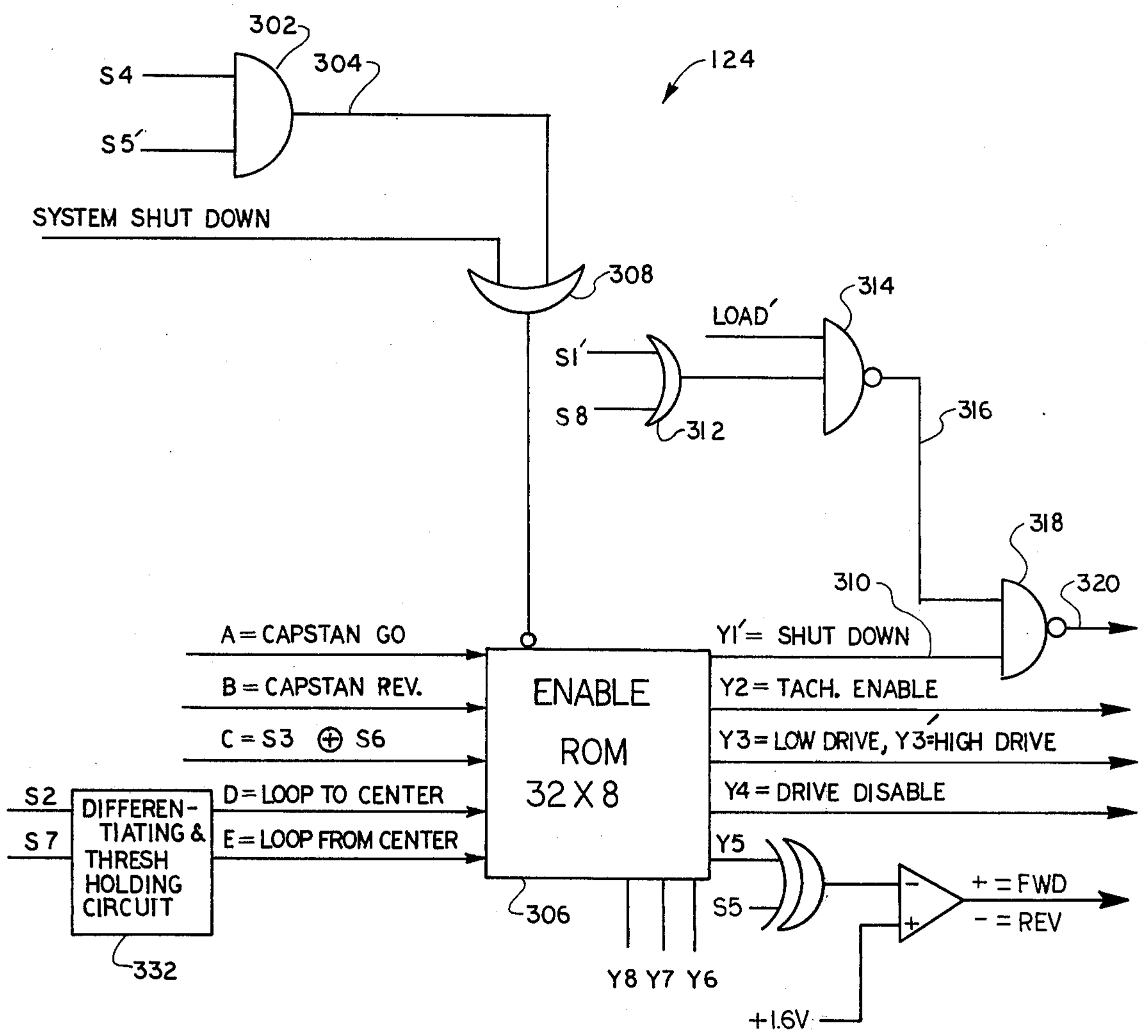
FIG. 12 is a somewhat simplified schematic and block diagram representation of a control circuit for a reel motor servo control system.

One arrangement of a reel servo system is illustrated in FIG. 8. FIG. 12 illustrates an advantageous arrangement of a portion of the control logic 124 for file reel 12 in FIG. 8.

The sensors shown in FIG. 8 are labeled sequentially S1–S8 with limit sensor 116 being labeled S1, photosensor 112 being labeled S2, sensor 117 being labeled S3, sensor 118 being labeled S4, sensor 120 being labeled S5, sensor 121 being labeled S6, photosensor 114 being labeled S7 and limit sensor 122 being labeled S8. The convention used herein is that a sensor output signal is true when the switch is covered by a tape loop and false when it is not covered by a tape loop.

An AND gate 302 receives sensor signals S4 and S5′ (S5′ being the logical complement of signal S5) and generates an output signal on conductor 304 which is true when the tape loop is in the region of vacuum chamber 110 between sensors S4 and S5. This region is commonly known as the deadband region of a vacuum chamber. This signal is O Red with a system shutdown signal and communicated to the inverting enable input of a read only memory (ROM) 306 through an OR gate 308. Rom 306 is thus disabled whenever the tape loop is inside the deadband or whenever a system shutdown signal is generated through control interface 126. When disabled, all outputs of ROM 306 go true and outputs Y2 and Y4 operate to actively brake the reel motor to a stop.

Output Y2 of ROM 306 is a tachometer enable signal. When tachometer 144 (FIG. 8) is enabled it provides a summing junction of preamp. 140 with a high gain negative feedback signal. The magnitude of the tachometer feedback signal is approximately linear with respect to rotational velocity below approximately 5 rpm but reaches a maximum positive or negative magnitude, dependent upon direction of rotation, and is clipped for rotational speeds in excess of approximately 5 rpm. When not enabled by signal Y2 the tachometer 144 provides a zero output and there is no velocity feedback for the reel motor. Output signal Y4 disables the drive inputs to the reel drive circuit 136 when true and enables the drive inputs when false. Thus, when both Y2 and Y4 are true, preamp. 140 receives no drive signal but does receive a velocity feedback signal, causing the reel motor to be rapidly driven to a stop.

ROM 306 output Y1 generates a shutdown command signal on conductor 310 when false. With the chosen convention, the shutdown command signal is not generated when ROM 306 is disabled, as when the tape loop is within the deadband. An OR gate 312 receives an inverted S1 switch signal and a S8 switch signal to generate an output indicating that the tape loop is not within the limit sensors S1 and S8 when true. A NAND gate 314 receives an inverted load signal as well as the output from OR gate 312 to generate a false output serving as a limit shutdown signal on conductor 316 whenever the tape loop is outside the limit sensors S1 and S8 and the transport is in other than a LOAD mode of operation. During a load mode of operation the tape loop is not expected to be between the limit sensors S1 and S8 and the limit shutdown signal is inhibited. A NAND gate 318 receives the command shutdown signal and the limit shutdown signal and generates a local shutdown signal on conductor 320 when either is true. As an example of the operation of the system with respect to shutdown commands, assume that ROM 306 receives a combination of address inputs causing output Y1 to assume state logic zero. NAND gate 320 responds by generating a true local shutdown signal which passes through control interface 126 to cause generation of a system shutdown signal, as by setting a flip flop. The system shutdown signal is conventionally communicated to the appropriate transport operating sections including the takeup reel servo control system. The takeup reel servo control system receives the system shutdown signal at an input to OR gate 308, causing ROM 306 to be disabled. The disabling of ROM 306 causes the shutdown command signal to be terminated and the reel motor to be actively braked as explained above.

Outputs Y3 and Y4 operate in combination to control the activation energy for the reel motor. When output Y4 is true, as when ROM 306 is disabled, drive commands to the reel drive circuit 136 are disabled and the summing junction of preamp. 140 receives no drive signal input. Output Y3 determines the magnitude of the drive signal input when the drive signal is enabled. A logic "false" output at Y3 causes generation of a full drive signal, for instance by providing a summing junction for preamp. 140 with a large magnitude reference drive current. When output Y3 is true, the reel motor is driven with only a portion of its full energization. An energization of approximately 30% of full energization has been found desirable. For instance, at true output at Y3 might cause the reference current input to the summing junction of preamp. 140 to be driven with only 30% of the full energization reference current.

Output Y5 controls the direction of energization for the reel motor, as by controlling the polarity of the reference drive current input to the summing junction of preamp. 140. Because the drive control of a reel motor is substantially symmetrical about tape loop positions on either side of the deadband, a single ROM 306 is used for controlling the reel motor whether the tape loop is in the top or bottom portion of the vacuum chamber 110 by selectively inverting the direction controlling output Y5. When the tape loop is in the portion of the supply reel vacuum chamber near the open end or in the portion of the takeup reel vacuum chamber 110 near the closed end a true output signal at output Y5 of ROM 306 indicates a forward drive command and a false output indicates a reverse output drive command. The convention is reversed when the tape loop is in the opposite portions of the respective vacuum chambers. In this way, a single read only memory can be used to control tape loop position in both the open and closed ends of a vacuum chamber and the same memory information may be stored by both the ROM used in the supply reel servo and the ROM 306 used in the takeup reel portion of the control logic 124.

The status of point sensor S5 is used to selectively invert the output Y5 from ROM 306. The output Y5 is connected to one input of an "exclusive OR" gate, output S5 to the other input. The output of the exclusive OR gate now determines the polarity of signal to be amplitude conditioned by the Y3 output of the ROM. Outputs Y6, Y7 and Y8 are not implemented in this embodiment and are logically irrelevant at all times.

The A input to ROM 306 is true or high whenever the capstan is turning in either direction. The B input is true or high when the capstan is rotating in a reverse direction and false or low when the capstan is rotating in a forward direction. The input C represents the logical exclusive-or of the outputs from point sensors S3 and S6 and is true whenever the tape loop is between these sensors. The D input is obtained by ORing the thresholded and differentiated S2 and S7 signals in such a way that the D input goes true whenever the tape loop is in the vicinity of one of the sensors S2, S7 and is moving toward the center of the vacuum chamber with at least a threshold velocity. Similarly, the E input signal is obtained by ORing the thresholded and differentiated S2 and S7 signals in such a way that the E input goes true whenever the tape loop is in the vicinity of one of the sensors S2, S7 and is moving away from the center of the vacuum chamber with at least a threshold velocity.

A preferred set of output signals for each of the 32 possible combinations of input signals is illustrated in Table V below.

TABLE V

| WORD | INPUT | OUTPUT | | | | |
|---|---|---|---|---|---|---|
| | E D C B A | Y5 | Y4 | Y3 | Y2 | Y1 |
| 0 | L L L L L | 1 | 0 | 1 | 0 | 1 |
| 1 | L L L L H | 1 | 0 | 1 | 0 | 1 |
| 2 | L L L H L | 1 | 0 | 1 | 0 | 1 |
| 3 | L L L H H | 1 | 0 | 0 | 0 | 1 |
| 4 | L L H L L | 1 | 0 | 0 | 0 | 1 |
| 5 | L L H L H | 1 | 0 | 1 | 0 | 1 |
| 6 | L L H H L | 1 | 0 | 0 | 0 | 1 |
| 7 | L L H H H | 0 | 0 | 0 | 0 | 1 |
| 8 | L H L L L | 1 | 1 | 0 | 0 | 1 |
| 9 | L H L L H | 1 | 1 | 0 | 0 | 1 |
| 10 | L H L H L | 1 | 1 | 0 | 0 | 1 |
| 11 | L H L H H | 1 | 1 | 0 | 0 | 1 |
| 12 | L H H L L | 1 | 1 | 0 | 1 | 1 |
| 13 | L H H L H | 1 | 1 | 0 | 1 | 1 |
| 14 | L H H H L | 1 | 1 | 0 | 1 | 1 |
| 15 | L H H H H | 0 | 0 | 1 | 0 | 1 |
| 16 | H L L L L | 1 | 1 | 0 | 0 | 0 |
| 17 | H L L L H | 1 | 1 | 0 | 0 | 0 |
| 18 | H L L H L | 1 | 1 | 0 | 0 | 0 |
| 19 | H L L H H | 1 | 0 | 1 | 0 | 1 |
| 20 | H L H L L | 1 | 0 | 1 | 0 | 1 |
| 21 | H L H L H | 1 | 1 | 0 | 0 | 0 |
| 22 | H L H H L | 1 | 0 | 1 | 0 | 1 |
| 23 | H L H H H | 1 | 0 | 1 | 0 | 1 |
| 24 | H H L L L | 1 | 1 | 0 | 0 | 0 |
| 25 | H H L L H | 1 | 1 | 0 | 0 | 0 |
| 26 | H H L H L | 1 | 1 | 0 | 0 | 0 |
| 27 | H H L H H | 1 | 0 | 1 | 0 | 0 |
| 28 | H H H L L | 1 | 0 | 1 | 0 | 0 |
| 29 | H H H L H | 1 | 1 | 0 | 0 | 0 |
| 30 | H H H H L | 1 | 0 | 1 | 0 | 0 |
| 31 | H H H H H | 1 | 0 | 1 | 0 | 0 |

While the invention has been particularly shown and described with reference to preferred embodiments thereof, it will be understood by those skilled in the art that the foregoing and other changes in form and details may be made therein without departing from the spirit and scope of the invention. Accordingly, any arrangement within the scope of the appended claims should be considered to be within the scope of the invention.

What is claimed is:

1. A magnetic tape transport comprising:

a pair of reel drive motors, each disposed to drive a different reel of tape with rotary motion and each including at least one wound field producing a component of magnetic field flux and a motor torque constant varying with the current therethrough;

a capstan positioned along a tape path extending between the pair of reels to drive magnetic tape intermediate the pair of reels;

a capstan motor connected to drive the capstan at a first maximum speed during intermittent program operation and at a speed greater than the first speed during rewind operation;

a pair of buffer loop forming devices positioned along the tape path to form a buffer loop of magnetic tape between the capstan and a reel of tape on each side of the capstan;

a magnetic head positioned along the tape path intermediate the capstan and one of said pair of tape buffer loop forming devices; and a motor control system including circuitry for driving at least one of the at least one wound field of each reel drive motor with a first current producing a first torque constant during intermittent program operation and with a second current producing a second torque constant substantially less than the first torque constant during rewind operation.

2. The tape transport as set forth in claim 1 above, wherein the capstan motor includes at least one wound field producing a component of magnetic flux and a motor torque constant varying with the current through the wound field and wherein the motor control system further includes capstan motor circuitry driving at least one of the at least one capstan motor field windings with a first current producing a first torque constant during intermittent program operation and with a second current producing a second torque constant substantially less than the first torque constant during rewind operation.

3. The tape transport as set forth in claim 1 above, wherein each reel motor includes a field generator producing a constant component of magnetic field flux and a constant component of a motor torque constant and wherein the first current produces a component of magnetic field flux in support of the constant component and the second current produces a component of magnetic field flux in opposition to the constant component.

4. The magnetic tape transport as set forth in claim 3 above, wherein the capstan motor includes at least one wound field producing a component of magnetic flux and a motor torque constant varying with the current therethrough and wherein the motor control system further includes capstan motor circuitry driving at least one of the at least one wound field of the capstan motor with a first current producing a first torque constant during intermittent program operation and with a second current producing a second torque constant substantially less than the first torque constant during rewind operation.

5. A bidirectionally and intermittently operable magnetic tape transport comprising:

a pair of reels defining the ends of a tape path;

a pair of buffer loop forming elements positioned along a tape path intermediate the pair of reels;

a capstan disposed to control tape motion intermediate the pair of tape loop elements;

a magnetic head positioned along a tape path intermediate the tape loop elements;

a pair of reel motors connected to drive the pair of reels in response to signals from reel motor control circuitry, said reel motors having first permanent magnet field generators and second wound field generators; and reel motor control circuitry connected to control the reel motors, the reel motor control circuitry including field control circuitry for variably energizing the wound fields to provide a first torque constant for intermittent operation and a second torque constant for rewind operation.

6. The tape transport as set forth in claim 5 above, wherein the field control circuitry changes between first and second torque constant energizations in a controlled manner.

7. The tape transport as set forth in claim 6 above, wherein the field control circuitry prohibits step function changes between the first torque constant and the second torque constant.

8. The tape transport as set forth in claim 7 above, wherein the field control circuitry changes the wound field energizations to vary the torque constants approximately linearly between the first and second torque constants.

9. The tape transport as set forth in claim 8 above, wherein the field control circuitry changes the wound field energizations to vary the torque constants in a manner causing the torque constants to lie approximately inversely proportional to the speed of the respective motors between the first and second torque constants.

10. The tape transport as set forth in claim 6 above, wherein the field control circuitry responds during rewind operation to begin the transitions of motor field energizations from first torque constant energizations to second torque constant energizations only after the reel motors have reached normal program operation speeds.

11. A tape transport having at least one tape driving element positioned along a tape path, the tape transport comprising a motor connected to drive the tape driving element, the motor including at least two field generators each generating a component of magnetic field flux with the flux component generated by at least one of said field generators being variable, and a field controller connected to vary the flux component generated by the variable flux field generator to provide at least two different torque constants for different tape transport operating conditions.

12. The tape transport as set forth in claim 11 above, wherein the field controller includes circuitry causing changes in the torque constant of the motor to be made in a controlled manner not a step function change.

13. The tape transport as set forth in claim 12 above, wherein the field controller causes the rate of change of the torque constant with respect to time to remain approximately constant as the torque constant is changed between two values.

14. The tape transport as set forth in claim 13 above, wherein the field controller changes the torque constant in response to a command to change from one nominal operating speed to a second nominal operating speed and the rate of change of torque constant with respect to time is selected such that time required to accelerate between the two operating speeds is approximately equal to the time to change between the corresponding torque constants.

15. The tape transport as set forth in claim 12 above, wherein the field controller changes the torque constant in a manner causing the product of motor speed and the torque constant to be maintained approximately constant.

16. The tape transport as set forth in claim 11 above, wherein the first operating condition is an intermittent program operating condition having a first nominal full speed, and wherein the field controller does not permit the product of torque constant and speed at speeds above the first nominal full speed to exceed twice the product of torque constant and speed at the first nominal full speed.

17. The tape transport as set forth in claim 11 above, wherein the two different torque constant vary in magnitude by a ratio of at least five to one.

18. The tape transport as set forth in claim 11 above, wherein the two different torque constants vary in magnitude by a ratio of at least six to one.

19. A tape transport having a pair of tape storage devices, a tape path extending between the tape storage devices, at least one tape buffer disposed along the tape path, a capstan disposed to drive tape along the tape path, and comprising:

a capstan motor connected to drive the capstan, the capstan motor including a first magnetic field generator and a second magnetic field generator generating a variable magnetic field;

a motor control system connected to control the second magnetic field generator to vary the torque constant of the capstan motor in accordance with a predetermined pattern.

20. The tape transport as set forth in claim 19 above, wherein the motor control system includes means for maintaining the torque constant at a predetermined magnitude when motor speed is below a selected motor speed and means for maintaining the torque constant generally inversely proportional to motor speed as the motor accelerates between the selected motor speed and a higher motor speed.

21. The tape transport as set forth in claim 20 above, wherein the motor control system includes an armature passing armature current in series through magnetic fields generated by the first and second magnetic field generators and wherein the motor control system controls the second magnetic field generator to provide a second magnetic field about the armature current which is similar in polarity to the first magnetic field at the selected motor speed and opposite in polarity to the first magnetic field at the higher motor speed.

22. In a magnetic tape transport having at least one reel for moving a length of magnetic tape bidirectionally at a nominal speed during normal programming operations and at a speed substantially higher than the nominal speed during rewind, and a power supply, a motor drive system coupled to drive the reel, the motor drive system comprising a variable torque constant motor and means providing the motor with a first torque constant for normal programming operation and a second torque constant different from the first torque constant for rewind, said motor drawing a nominal, substantially fixed amount of current from the power supply independent of the torque constant thereof.

23. The invention as set forth in claim 22, wherein the motor includes at least one fixed field and at least one field winding for generating a variable field, and further comprising a drive circuit coupled between the power supply and the at least one field winding, the drive circuit being operative to energize the at least one field winding with a direct current of one sense to provide the first torque constant and a direct current of opposite sense to provide the second torque constant.

24. The invention as set forth in claim 23, wherein the motor includes a permanent magnet for generating one component of a magnetic field having a total net flux which is increased when the field winding is energized with the direct current of one sense and which is decreased when the field winding is energized with the direct current of opposite sense.

25. A magnetic tape transport comprising:

a pair of rotatable reels adapted to have the opposite ends of a length of magnetic tape wound thereon;

means disposed along a tape path extending between the rotatable reels for processing the magnetic tape including capstan means for driving the tape and magnetic head means for recording, reading and erasing information stored on the tape;

a pair of vacuum chambers arranged to form buffering loops of tape on opposite sides of the processing means;

sensor means associated with the vacuum chambers for providing indications of the positions of the tape loop within the vacuum chambers;

a pair of motors respectively coupled to drive the pair of reels; and servo means coupled to the motors and responsive at least to the sensor means to drive the reels bidirectionally and within a nominal speed range so as to maintain nominal lengths of the tape loops during normal operation of the tape transport and to drive the reels at a speed substantially greater than the nominal speed range during rewind of the tape transport;

each of the pair of motors including a plurality of separate field generating means, the energization of at least one but not all of which is changed as necessary to enable the motor to operate with a first torque constant for normal operation and with a second torque constant different from the first torque constant for rewind.

26. The invention as set forth in claim 25, wherein each motor includes a permanent magnet for providing a first field and at least one winding for providing a second field when energized.

27. The invention as set forth in claim 26, wherein the at least one winding is energized in one sense to provide the first torque constant and in an opposite sense to provide the second torque constant.

28. The method of operating a tape transport having at least one tape drive motor having a first field generator and a second variable field generator generating a second field which is variable in response to control of the energization of the second field generator, the motor being disposed to drive tape along a tape path, the method comprising the step of controlling the torque constant of the tape drive motor by controlling the energization of the second field generator to maintain the motor torque constant generally inversely proportional to motor speed over a selected operating range of motor speeds.

29. The method of operating a tape transport as set forth in claim 28 above, wherein the step of controlling includes the steps of maintaining the torque constant constant at selected lower operating speeds and varying the energization of the second field generator to maintain the torque constant generally inversely proportional to motor speed as the motor accelerates over a selected range of motor operating speeds greater than said selected lower operating speeds.

30. The method of operating a tape transport as set forth in claim 20 above, wherein the selected lower operating speeds are speeds encountered during program operating and the motor accelerates over the selected range of motor operating speeds greater than said selected lower operating speeds during rewind.

31. The method of operating a tape transport as set forth in claim 29 above, the step of varying includes the step of varying the second field generator energization approximately linearly between energizations of opposite polarity and equal magnitude as the motor accelerates over the range of operating speeds greater than said selected lower operating speeds.

* * * * *